United States Patent [19]
Saito et al.

[11] Patent Number: 6,075,679
[45] Date of Patent: Jun. 13, 2000

[54] MAGNETO-RESISTIVE HEAD ACCOMMODATING A NARROW GAP

[75] Inventors: Mikiko Saito; Fujio Suzuki, both of Tokyo, Japan

[73] Assignee: NEC Corporation, Tokyo, Japan

[21] Appl. No.: 09/110,887

[22] Filed: Jul. 7, 1998

[30] Foreign Application Priority Data

Jul. 10, 1997 [JP] Japan ........................ 9-185216

[51] Int. Cl.[7] .................. G11B 5/39; G11B 5/147
[52] U.S. Cl. ........................... 360/113; 360/126
[58] Field of Search ..................... 360/113, 126

[56] References Cited

U.S. PATENT DOCUMENTS 5,870,262  2/1999  Ikegawa .................... 360/126

FOREIGN PATENT DOCUMENTS

| 62-214507 | 9/1987  | Japan . |
|-----------|---------|---------|
| 63-16408  | 1/1988  | Japan . |
| 5-274626  | 10/1993 | Japan . |
| 8-77514   | 3/1996  | Japan . |
| 8-167123  | 6/1996  | Japan . |
| 8-221721  | 8/1996  | Japan . |
| 8-293108  | 11/1996 | Japan . |
| 9-161237  | 6/1997  | Japan . |
| 10-40517  | 2/1998  | Japan . |

*Primary Examiner*—A. J. Heinz
*Attorney, Agent, or Firm*—Young & Thompson

[57] ABSTRACT

A magneto-resistive (MR) head having a read element including two magnetic shield films, two magnetic gap films which separate the two magnetic shield films and which are held between the two magnetic shield films, and an MR element held between the two magnetic gap films, with the two magnetic gap films having a stress value of up to 200 MPa.

14 Claims, 3 Drawing Sheets

MAGNETO-RESISTIVE HEAD ACCOMMODATING A NARROW GAP

BACKGROUND OF THE INVENTION

1. Field of the Invention

The present invention relates to an MR (Magneto-Resistive) head which reads information written on a magnetic recording medium with an MR element (Magneto-Resistive element), and a manufacturing process for it.

2. Description of the Prior Art

In general, an MR head has a structure in which magnetic shielding films are disposed on and under an MR element (magnetic sensitive section) through magnetic gap films to effectively accept leakage flux from a magnetic recording medium. In addition, an MR head is formed on a wafer, cut out and ground to expose the MR element on a surface opposite to the magnetic recording medium, thereby detecting the leakage flux from the magnetic recording medium. Moreover, Japanese Patent Application Laid-Open No. 8-293108 discloses an invention which uses a film with ability to withstand high voltage having a thickness 30 nm or less as a magnetic separating film between a soft magnetic film and an MR film of a magneto-resistive head. Furthermore, Japanese Patent Application Laid-Open Nos. 8-221721 and 8-167123 disclose an invention, wherein, in forming a magneto-resistive head element and a recording/reproduction separated combination head element, the element is prevented from dielectric breakdown due to static electricity during the process by short-circuiting a pair of electrodes constituting the magneto-resistive head, thereby forming the element with a high yield.

BRIEF SUMMARY OF THE INVENTION

An MR element in an MR head has a problem that it tends to be dielectrically broken because it consists of very thin films. In addition, thickness is about 250–300 nm for upper and lower magnetic shield films of the MR head and magnetic gap films of the MR element, so that dielectric breakdown tends to occur due to steps in the electrodes or the like. It is anticipated that dielectric voltage is further lowered because the insulating film is made to have a thinner thickness to accommodate a narrower track and a narrower gap which are necessary for higher density.

However, a magnetic gap film consisting of $Al_2O_3$ discussed in Japanese Patent Application Laid-Open Nos. 62-214507 and 63-16408 cannot assure sufficient dielectric voltage for a thin film with thickness of 1,000 Angstrom or less, so that it is difficult to be thinned. In addition, if an alumina film has a high stress value, weak area in the film arises. Such a weak area can be easily chemical-etched when the film is thinned, leading to degradation of the film or causing a lower dielectric voltage.

OBJECT OF THE INVENTION

An object of the present invention is to provide an MR head which can stably supply a magnetic gap film accommodating a narrower gap, and a manufacturing process for it.

SUMMARY OF THE INVENTION

The present invention is an MR head comprising a read element, the reproduction head consisting of two opposite magnetic shield films, two opposite magnetic gap films held between the two magnetic shield films, and an MR element held between the two magnetic gap films, wherein a stress value of the magnetic gap film is 200 MPa or less. It may be an MR head comprising a recording (writing) head and a read element (reproduction head), the recording head comprising a coil held between two opposite magnetic poles through an inter-layer insulating film, and a recording gap provided at an end between the two opposite magnetic poles, the recording head and the read element being laminated, one of the two magnetic shield films also serving as one of the two magnetic poles, wherein a stress value of the magnetic gap film is 200 MPa or less. In addition, the magnetic gap film may be an insulating film mainly consisting of $Al_2O_3$, or an insulating film mainly consisting of $Al_2O_3$ and $SiO_2$ (preferably, 30 wt. % or more being contained in the entire volume).

A manufacturing process for MR head according to the present invention comprises the step of forming the (said) magnetic gap film by sputtering a target of $Al_2O_3$ or $Al_2O_3$ and $SiO_2$ in a mixed gas of Ar and $O_2$. In this case, it is preferable to form the magnetic gap film at a sputter power of 6 W/cm² or more.

Lowering stress in the magnetic gap film reduces pinhole density in the film, so that the insulating performance of the film is improved. It has been found that the stress in the magnetic gap film can be further reduced by adding $SiO_2$ in the alumina target, or mixing oxygen in Ar gas in the sputtering step. Thus, improvement of dielectric voltage of the magnetic gap film can prevent so called dielectric breakdown that the MR element is broken as over-voltage is applied.

DETAILED DESCRIPTION OF THE PREFERRED EMBODIMENTS

Figure 1:
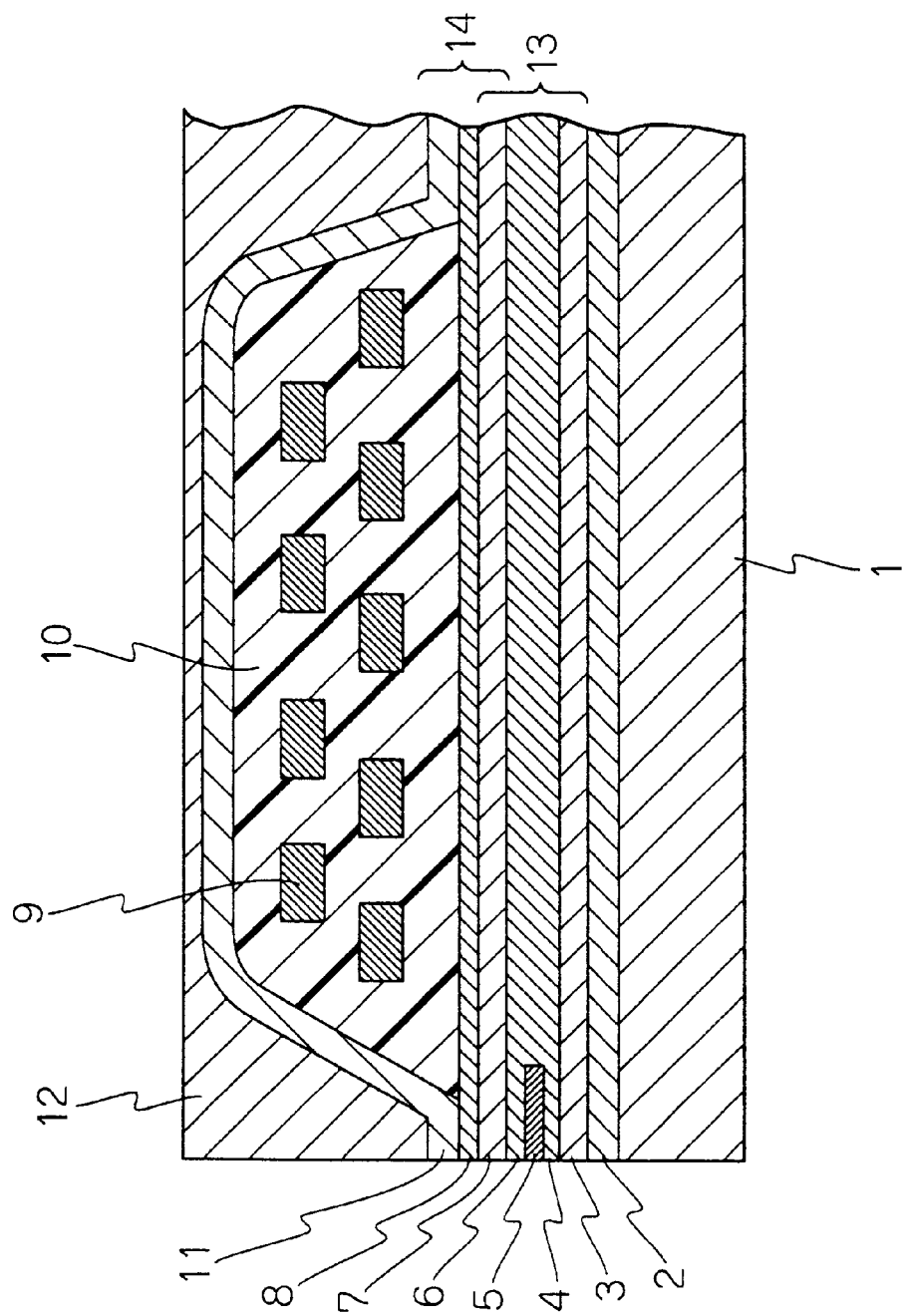
FIG. 1 is a schematic sectional view showing an embodiment of an MR head according to the present invention.
Figure 2:
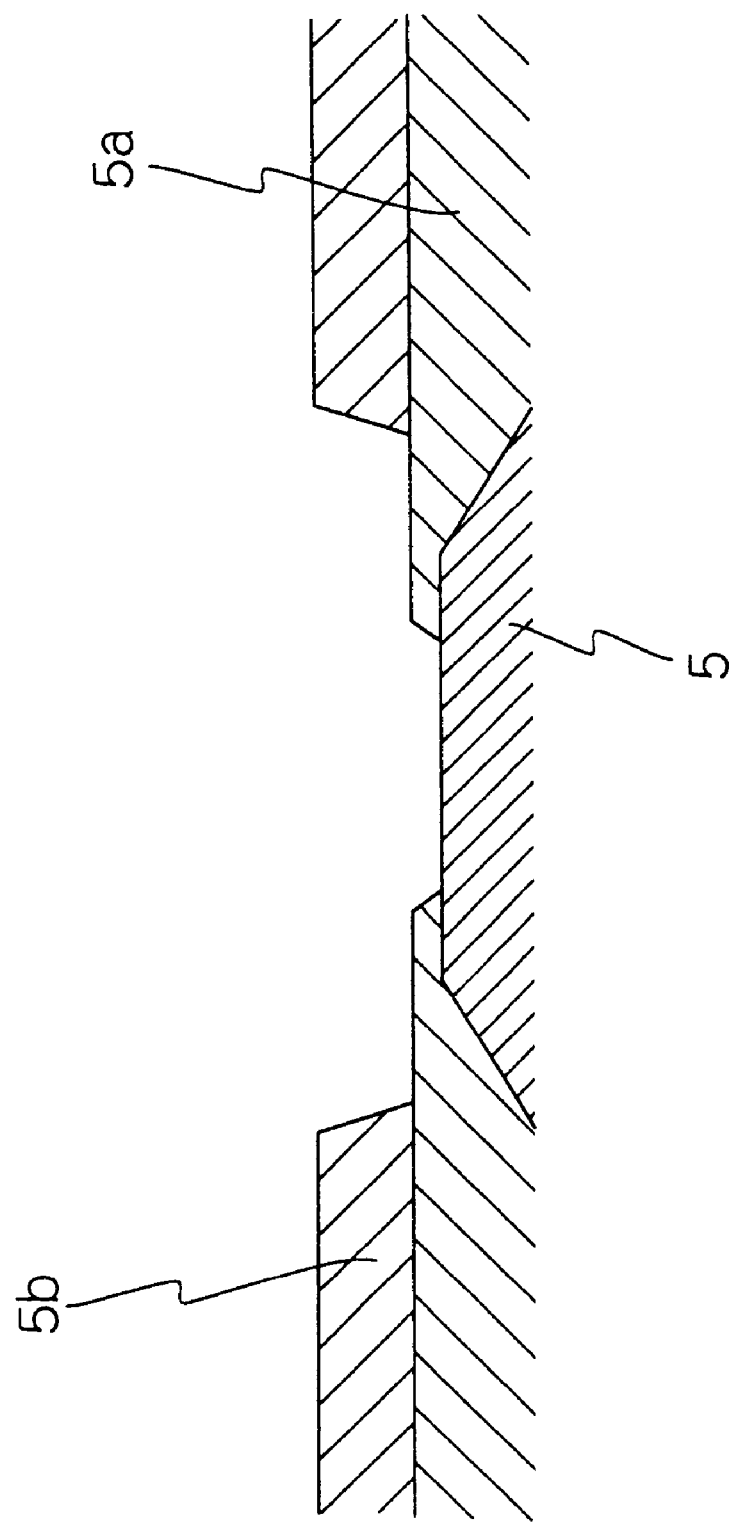
FIG. 2 is a partial enlarged view showing an MR element in the MR head of FIG. 1.

FIG. 1 is a schematic sectional view showing an embodiment of an MR head according to the present invention. FIG. 2 is a partial enlarged view showing an MR element in the MR head of FIG. 1. Now, description is made based on these figures.

The MR head of this embodiment comprises a read element 13 which consists of two opposite magnetic shield films 3 and 7, two opposite magnetic gap films 4 and 6 held between these magnetic shield films 3 and 7, and an MR element 5 held between these magnetic gap films 4 and 6, and a recording head 14 which consists of a coil 9 held between two opposite magnetic poles 7 and 11 through an inter-layer insulating film 10, a recording gap 8 being provided at one end of the magnetic poles 7 and 11, the recording head 14 being stacked on the read element 13, the magnetic shield film 7 also serving as the magnetic pole 11. Then, it is characterized in that a stress value of the magnetic gap films 4 and 6 is 200 MPa or less. The recording head 14 and the read element 13 are stacked on an insulating film 2 on a substrate 1. The recording head 14 is covered with a
} protective film 12. The MR element 5 comprises three layers of a soft bias film, an intermediate film, and an MR film (not shown), and is further provided with a domain control film 5a and an electrode film 5b.

EXAMPLE 1

Now, Example 1 of the MR head according to the present invention is described with reference to FIGS. 1 and 2.

First, there is prepared a substrate 1 consisting of ceramics such as $Al_2O_3$.TiC. Then, an insulating film 2 consisting of alumina or the like is formed on the substrate 1 to 10 µm with sputtering. Subsequently, a magnetic shield film is laminated in 3–5 µm by plating NiFe, and a magnetic gap film 4 consisting of an alumina film is formed thereon in 800 angstrom. Then, the MR element 5 is formed. The MR element 5 consists of three layers of a soft bias film of 250 angstrom consisting of CoZrMo or the like for applying a bias magnetic field to an MR film, an intermediate film of 200 angstrom consisting of Ta or the like, and an MR film of 200 angstrom consisting of NiFe. Typically, the MR head suffers from a problem that noise called "Barkhausen noise" is generated due to movement or extinction of a domain wall. Thus, to suppress the Barkhausen noise in the MR head of this example, a domain control film (for example, a hard film) 5a is formed in 200–400 angstrom at a region of the MR film other than at the track section with, for example, a lift-off process. At the same time, a electrode film 5b is formed in 2,000 angstrom for causing a sense current to flow through the MR film. The electrode film 5b may be, for example, Au or the like. Then, a magnetic gap film 6 consisting of an alumina film is formed in 800 angstrom. Thereafter, a magnetic shield film (also as magnetic pole) 7 is formed in 3–5 µm by plating NiFe, and worked into a predetermined shape to complete manufacturing of the read element 13.

Then, the recording head 14, which is a write-only inductive magnetic head, is stacked on the read element 13. The magnetic pole 7 can be served by the magnetic shield film 7. Therefore, first, an alumina insulating layer which constitutes the recording gap 8 is formed on the magnetic pole 7 in 5,000 angstrom. Then, resist as the inter-layer insulating film 10 is formed and heat clamped in 3–5 µm, followed by forming a write coil 9 in 3–5 µm which consists of a good conductor such as Cu. Again, resist as the inter-layer insulating film 10 is formed in 10 µm. Then, the magnetic pole 11 is formed in 3–5 µm by plating NiFe, and a protective film 12 consisting of alumina or the like is formed in 10 µm. They are worked into a predetermined shape to complete the manufacture of the recording head 14.

Here, the magnetic gap film 4 and 6 consisting of an alumina film, and the recording gap 8 are arranged to have a stress value of 200 MPa or less. When the stress value is arranged to be less than such value, it has been confirmed that pinhole density in the film is reduced, and the insulating property and the resistance against chemical etching are improved.

EXAMPLE 2

While the MR head of Example 1 applies the low stress alumina film to the magnetic gap films 4 and 6, the present invention can be also applied to a spin valve arrangement and even to a GMR head, and it has been confirmed that the present invention assures sufficient gap insulating property for a head with such arrangement.

EXAMPLE 3

Figure 3:
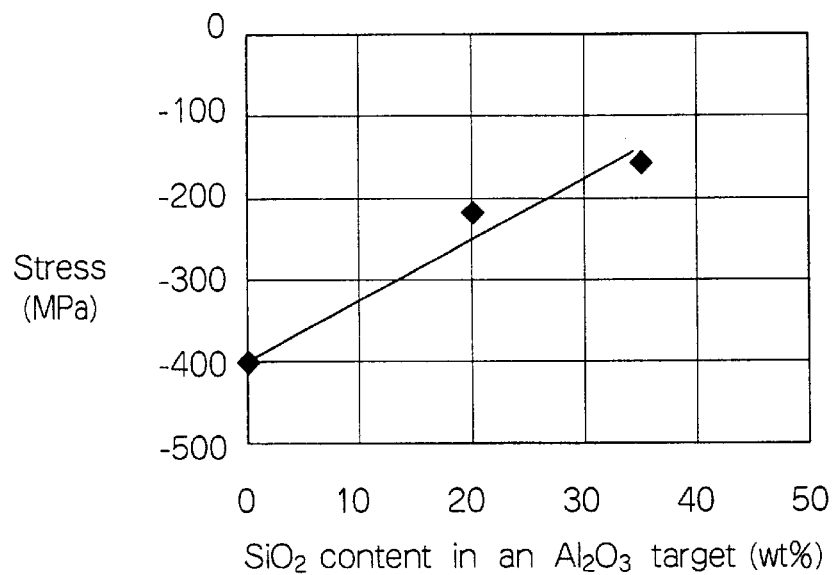
FIG. 3 is a graph showing relationship between added amount content of $SiO_2$ to an alumina target and a stress value of the alumina film in an example of the present invention.

This example is a case where the magnetic gap films 4 and 6, and the recording gap 8 are in an $Al_2O_3$—$SiO_2$ arrangement. FIG. 3 shows a result on investigation of the stress value of an alumina film which is formed by using a target of alumina mixed with $SiO_2$ against the amount of added $SiO_2$. Adding of $SiO_2$ reduces the stress value. When $SiO_2$ is added by 30 wt. %, the stress value can be reduced to about one half when compared with alumina only. This leads to reduction of pinhole density, which in turn leads to improvement of dielectric voltage of the magnetic gap film when the film thickness is reduced. It is dielectric breakdown of the magnetic gap film that is a major concern when the film is thinned. It has been confirmed that $SiO_2$ and $Al_2O_3$ are very effective against the dielectric breakdown. As shown in FIG. 3, experimental results indicate that a stress value in the magnetic gap film of less than 200 MPa, can be realized with the $SiO_2$ content in the $Al_2O_3$ being at least 30 (wt %).

EXAMPLE 4

Figure 4:
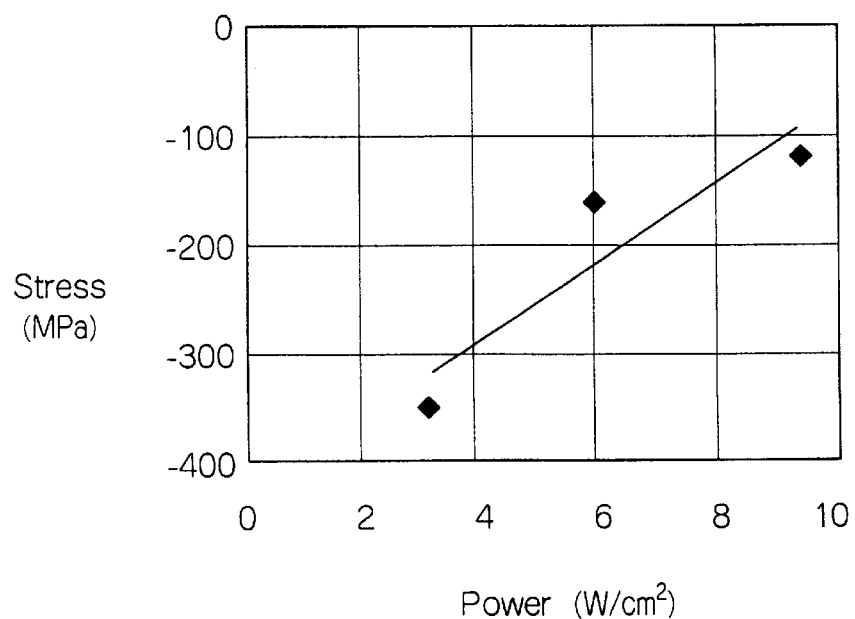
FIG. 4 is a graph showing relationship between sputtering power in forming an alumina film and a stress value of the alumina film.

This example is a case where effect of sputtering power is investigated to reduce the stress value of alumina film. FIG. 4 shows a result where the relationship between the sputtering power and the stress value of the alumina film is investigated. It is found that the stress value of alumina film can be reduced by increasing the sputtering power. For example, for sputtering power of 6 $W/cm^2$ or higher, the stress value can be reduced to 200 MPa or less, which leads to reduction of pinhole density, and improvement of dielectric voltage of the alumina film when it is thinned.

EXAMPLE 5

This example is a case where, in forming the $SiO_2$—$Al_2O_3$ film of the Example 2, the film formation is carried out by mixing oxygen in normal Ar gas. Even if the flow rate of the gas is a ratio of mixed oxygen as low as 50:1, the effect is significant for its dielectric voltage. It has become possible to enhance the dielectric strength 1.5 times by mixing oxygen. While it concerned that use of oxygen may cause an effect of oxidation of the magnetic film, it has been confirmed that its insulating property is sufficiently assured by, for example, performing initial film formation in normal Ar gas, and then changing over to Ar+oxygen mixed gas.

According to the present invention, it has been found that, when the magnetic gap film is arranged to be an alumina insulating film with a stress value of 200 MPa or less, its insulating property can be improved even when the film is thinned. In addition, the insulating property can be further improved by adding $SiO_2$ of 30 wt. % or more, thereby making it a film with a further lower stress value. Since sufficient dielectric voltage can be assured even when the film is thinned, the manufacturing yield can be improved, and yield can be improved even against damage from dielectric breakdown. Since this allows the magnetic gap film to be thinned, high performance can be attained for an MR head for providing a high density magnetic head.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 9-185216 (Filed on Jul. 10, 1997) including specification, claims, drawings and summary are incorporated herein by reference in its entirety.

What is claimed is:

1. An MR head comprising a read element, the read element comprising:

two magnetic shield films;

two magnetic gap films intermediate said two magnetic shield films separating said two magnetic shield films, said two magnetic gap films having a stress value of up to 200 MPa; and an MR element held between said two magnetic gap films.

2. The MR head as set forth in claim 1, wherein said two magnetic gap films comprise an insulating film of $Al_2O_3$.

3. The MR head as set forth in claim 2, wherein said two magnetic gap films are formed by sputtering an $Al_2O_3$ target in a mixed gas of Ar and $O_2$.

4. The MR head as set forth in claim 2, where said insulating film comprises $Al_2O_3$.

5. The MR head as set forth in claim 1, wherein said two magnetic gap films comprise an insulating film of $Al_2O_3$ and $SiO_2$.

6. The MR head as set forth in claim 5, wherein said $SiO_2$ comprises at least 30 wt. % of said two magnetic gap films.

7. The MR head as set forth in claim 5, wherein said two magnetic gap films are formed by sputtering a target of $Al_2O_3$ and $SiO_2$ in a mixed gas of Ar and $O_2$.

8. An MR head comprising:

a read element, said read element comprising:

two magnetic shield films;

two magnetic gap films intermediate said two magnetic shield films and being held between said two magnetic shield films;

said two magnetic gap films having a stress value of up to 200 MPa, an MR element held between said two magnetic gap films; and a recording head, said recording head comprising a coil held within an inter-layer insulating film intermediate two magnetic poles, and a recording gap provided at an end between said two magnetic poles, said recording head and said read element each being laminated, and one of said two magnetic shield films being designed and adapted to serve as one of said two magnetic poles.

9. The MR head as set forth in claim 8, wherein said two magnetic gap films comprise an insulating film of $Al_2O_3$.

10. The MR head as set forth in claim 9, wherein said two magnetic gap films are formed by sputtering an $Al_2O_3$ target in a mixed gas of Ar and $O_2$.

11. The MR head as set forth in claim 9, where said insulating film comprises $Al_2O_3$.

12. The MR head as set forth in claim 8, wherein said two magnetic gap films comprise an insulating film of $Al_2O_3$ and $SiO_2$.

13. The MR head as set forth in claim 12, wherein said $SiO_2$ comprises at least 30 wt. % of said two magnetic gap films.

14. The MR head as set forth in claim 12, wherein said two magnetic gap films are formed by sputtering a target of $Al_2O_3$ and $SiO_2$ in a mixed gas of Ar and $O_2$.

* * * * *